United States Patent [19]

Akins

[11] Patent Number: 5,399,390

[45] Date of Patent: Mar. 21, 1995

[54] LIQUID CRYSTAL DISPLAY WITH POLYMERIC SUBSTRATE

[75] Inventor: Robert B. Akins, Coral Springs, Fla.

[73] Assignee: Motorola, Inc., Schaumburg, Ill.

[21] Appl. No.: 186,952

[22] Filed: Jan. 27, 1994

[51] Int. Cl.⁶ .................... G02F 1/1339; G02F 1/133
[52] U.S. Cl. .......................................... 428/1; 359/81; 359/82; 359/53; 359/96
[58] Field of Search ................ 428/1; 359/82, 81, 53, 359/101, 99, 96

[56] References Cited

U.S. PATENT DOCUMENTS 4,973,138  11/1990  Yamazaki ............................ 350/344
5,268,782  12/1993  Wenz et al. ............................ 359/82

*Primary Examiner*—Alexander S. Thomas
*Attorney, Agent, or Firm*—Kenneth M. Massaroni

[57] ABSTRACT

A liquid crystal display device (60) having first and second polymeric substrates (30) and (62) and a layer of cholesteric liquid crystal material disposed therebetween. The cholesteric liquid crystal material is disposed in a plurality of channels (36), (38), and (40) formed in one surface (32) of one of said substrates. The liquid crystal material may be further adapted to reflect light of specific wavelengths, so as to affect a color liquid crystal display.

14 Claims, 3 Drawing Sheets

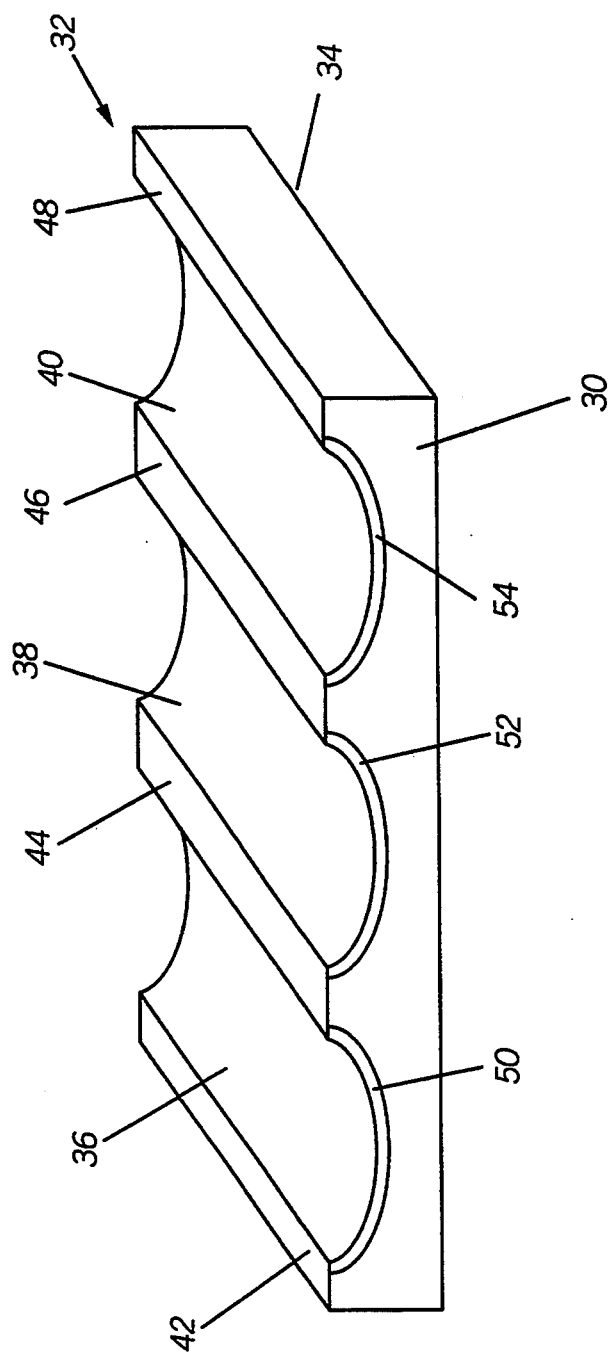

LIQUID CRYSTAL DISPLAY WITH POLYMERIC SUBSTRATE

TECHNICAL FIELD

This invention relates in general to liquid crystal display devices, and more particularly liquid crystal display devices having plastic substrates.

BACKGROUND

Liquid crystal display (LCD) devices contain liquid crystal material operatively disposed between a pair of planar substrates. The facing surfaces of the substrates are typically coated with a continuous layer of a transparent conductive material which serves as an electrode. One may create optical changes in the liquid crystal material by applying a voltage to selected portions of the facing electrodes.

The substrates upon which the transparent conductive material is disposed is typically a high quality glass material, such as Corning 7059 glass. However, glass substrates suffer from several inherent limitations. For example, glass is relatively heavy and fragile. Accordingly, glass places significant constraints upon the manufacturing processes. Glass substrates require careful handling as they are breakable. Moreover, since glass is relatively heavy, automated fabrication machines must be built in order to accommodate the relatively heavy weight of the glass substrates.

Recent activity has aimed at fabricating LCDs with plastic substrates. Plastic substrates are attractive as they are thinner, lighter, and less susceptible to breakage than their glass counterparts. Plastic substrates also lend themselves more readily to continuous manufacturing processes. As a result, plastic substrates may ultimately lead to higher quality, lower cost displays, which are more readily adaptable to different applications.

Plastic substrates are, however, not without some problems. For example, plastic substrates are more flexible than their glass counterparts, and hence contribute to manufacturing defects. Thickness control of the plastic used in the substrate is also a problem, particularly since displays require very careful control of the spacing between the adjacent display substrates. Flexibility is further a problem in that as the display device flexes, spacing between the parallel substrates changes in localized areas, causing different responses of the liquid crystal material disposed therebetween. In order to address this problem, displays have been manufactured with edge seals and spacer beads or fibers disposed between the parallel substrates. However, the use of spacer beads or fibers contributes to other problems in manufacturing the displays. Accordingly, researchers have been working to eliminate the use of spacer beads or fibers, and have attempted to do so by using plastic display substrates with a ribbed structure. FIG. 1 illustrates an example of such a prior art ribbed structure 10. The ribbed structure 10 includes a plurality of ribs 12, 14, 16, with valleys 18, 20 disposed there between.

LCDs having ribbed substrate surfaces as illustrated in FIG. 1 have heretofore been developed for twisted nematic type LCDs. Twisted nematic displays require flat, parallel rib and valley surfaces coated with thin alignment layers 22 (typically a polyimide), in order for the material to provide the desired optical effect. Substrate surfaces for use with these types of materials, must be substantially free from scratches or particle chips, as surface defects can degrade the image contrast of the display. Ribbed substrates such as those shown in FIG. 1 can be difficult to manufacture with defect free, fiat, square ribs and valleys. Moreover, since twisted nematic displays are polarization sensitive devices, the polymer for the substrate must be optically isotropic, or at least possess a well defined optic axis. This limits the use of many otherwise desirable polymeric materials. Moreover, full color LCDs using ribbed, polymeric substrates have not been demonstrated.

Accordingly, there exists a need for a liquid crystal display device which uses lightweight polymeric substrates, manufactured from optically anisotropic polymeric materials. There is also a need for full color LCD devices fabricated from light weight polymeric substrates.

SUMMARY OF THE INVENTION

Briefly, according to the invention, there is provided a liquid crystal display device having a first substrate, a second substrate, and a layer of liquid crystal material disposed therebetween. The first and second substrates are fabricated of a polymeric material, such as an optically anisotropic polymeric material. Deposited on one surface of the first substrate is a layer of transparent conductive material. The transparent conductive material may be, for example, a transparent conductive oxide such as indium tin oxide.

The second substrate has a plurality of parallel channels formed on one surface thereof. The channels may be either square, concave, hemispherical, or other irregular or regular shape. Disposed in each said channel is a layer of transparent conductive oxide such as that discussed hereinabove. The first and second substrates are arranged so that the surfaces having transparent conductive material disposed thereon, are in substantially parallel, facing relationship. The first and second substrates are bonded together either at the edges thereof, or in the regions between each adjacent channel.

The layer of liquid crystal material disposed between said substrates is preferably a cholesteric liquid crystal material. The cholesteric liquid crystal material may further be tuned, tailored or otherwise admixed with other materials so as to change the pitch of the liquid crystal material. The resulting admixed material will reflect different wavelengths of light. Accordingly, by mixing different materials, it is possible to tailor the liquid crystal material to reflect various colors of light, such as red, green, or blue light.

In an alternative embodiment, two or more liquid crystal display devices such as that described hereinabove may be disposed in stacked relationship relative to one another. In this stacked relationship, the channels in each device may be arranged, for example, in parallel and overlapping relationship to one another, or substantially orthogonally to one another. Moreover each liquid crystal display device stacked one on the other may be adapted to reflect a different color light. Accordingly, three such liquid crystal display devices may be stacked one atop another, the first being adapted to reflect, for example, red light, the second being adapted to reflect blue light, and the third being adapted to reflect green light, in order to provide a full color display device.

BRIEF DESCRIPTION OF THE DRAWINGS

FIG. 2 is a perspective view of one substrate of a liquid crystal display device in accordance with the invention.

DETAILED DESCRIPTION OF THE PREFERRED EMBODIMENT

Figure 1:
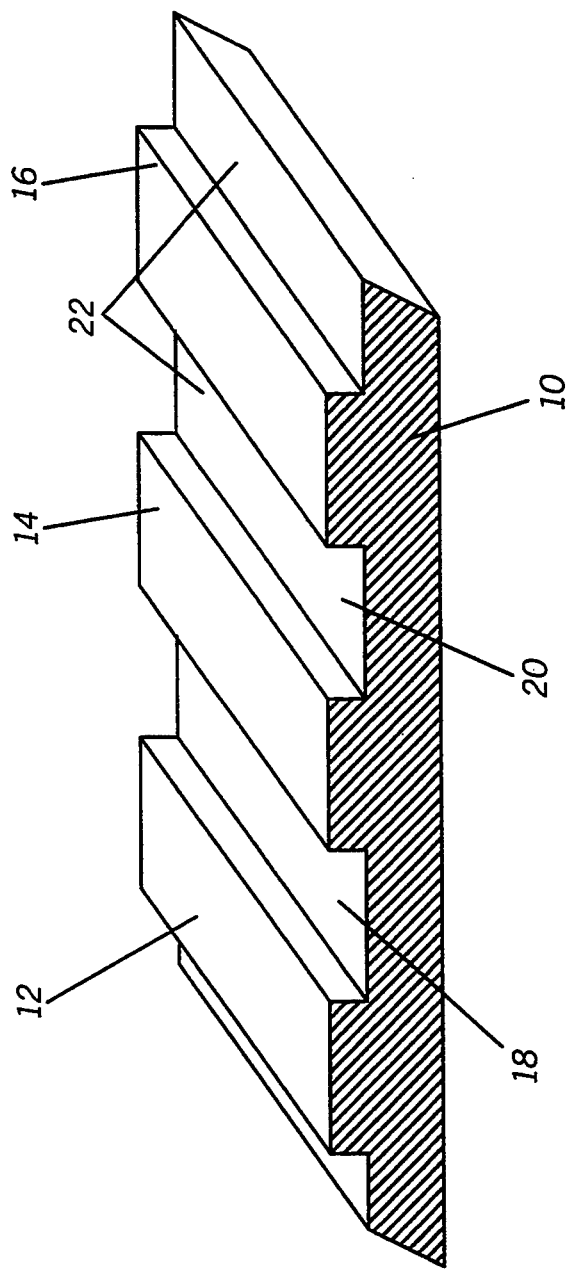
FIG. 1 is a perspective view of a ribbed substrate for a liquid crystal display device of the prior art.

While the specification concludes with claims defining the features of the invention that are regarded as novel, it is believed that the invention will be better understood from a consideration of the following description in conjunction with the drawing figures, in which like reference numerals are carried forward.

Referring now to FIG. 2, there is illustrated therein a perspective view of one substrate of a liquid crystal display device in accordance with the instant invention. The substrate 30 is fabricated of a polymeric material, and may be an optically anisotropic polymeric material. Examples of preferred polymeric substrate materials includes extruded thermoplastic films such as polyester, Mylar, Kapton, polyethylene-tera phalate, polyeheretherketone, polyetherimide (ULTEM ®), polyvinylidene fluoride (KYNAR ®), and combinations thereof. It is to be understood, however, that other polymeric substrates, optically anisotropic or otherwise, may be used without departing from the spirit or scope of the invention.

The substrate 30 has first and second surfaces 32 and 34. Formed into the first surface 32 of said substrate 30 is a plurality of substantially parallel channels, for example, 36, 38 and 40. It is to be noted that while FIG. 2 illustrates three such parallel channels, the number of such channels may be substantially greater, and may be determined based upon the particular application for the liquid crystal display device and into which the substrate 30 is incorporated. The channels 36, 38, 40 illustrated in FIG. 2 are substantially concave or scalloped channels. It is to be noted, however, that said channels may be square, hemispherical, or any other regular or irregular shape. The channels may be formed into the surface 32 of substrate 30 by any of a number of techniques known in the art.

Between each channel 36, 38, 40 is a rib 42, 44, 46, 48 provided to give structural support to the liquid crystal display device into which the substrate 30 is incorporated. The ribs 42, 44, 46, 48 may also serve as bonding surfaces for attaching the substrate 30 to a second substrate (described in greater detail below).

Disposed inside each of said channels 36, 38 and 40 is a thin layer of a transparent conductive material, 50, 52 and 54 respectively. Said thin layers of transparent conductive material 50, 52 and 54 may be formed of transparent conductive oxide, such as, indium tin oxide. The layer of transparent conductive material is adapted to function as an electrode for the application of an electrical charge to cholesteric liquid crystal material disposed in each said channel.

Figure 3:
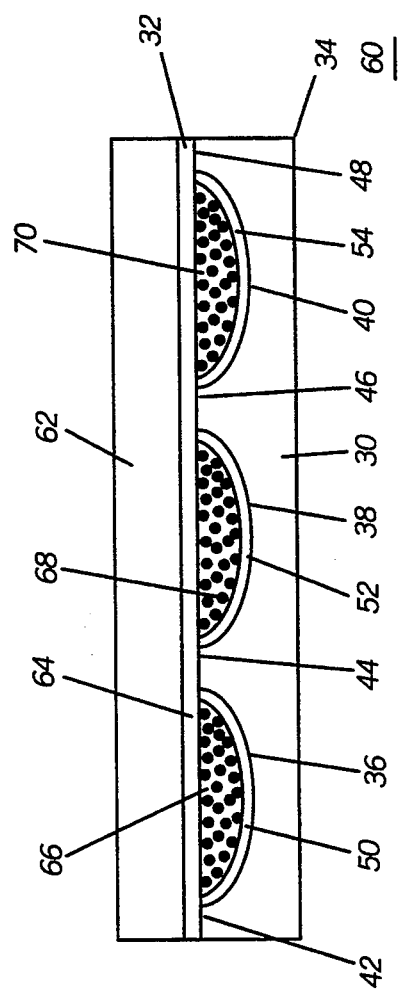
FIG. 3 is a cross sectional view of a liquid crystal display device in accordance with the invention.

Referring now to FIG. 3, there is illustrated therein a cross sectional view of a liquid crystal display device fabricated in accordance with the instant invention. The liquid crystal display device 60 includes a first substrate 30 as described hereinabove with respect to FIG. 2. Substrate 30 has a plurality of channels 36, 38 and 40 formed therein. Disposed between each said channel is a rib 42, 44, 46 and 48. Disposed in each channel is a thin layer of transparent conductive material 50, 52 and 54 all as described hereinabove with respect to FIG. 2.

The liquid crystal display device 60 further includes a second substrate 62 also formed of a polymeric material, such as that described with respect to substrate 30. Substrate 62 is a substantially flat, planar substrate having a layer of transparent conductive material 64 disposed on one surface thereof. Transparent conductive material 64 may be a material such as that described hereinabove with respect to layers 50, 52 and 54. It is to be noted that the transparent conductive materials may be deposited on substrates 30 and 62 by any of a number of conventionally known techniques.

The first 30 and second substrate 62 are arranged adjacent to one another, in substantially parallel, facing relationship so that the surfaces with layers of transparent conductive material are disposed to face one another. Said first and second substrates are then bonded to one another in the areas between each channel, i.e., at the ridges formed between each channel, and/or at the edges of each substrate.

Disposed in each channel 50, 52 and 54 is a layer of cholesteric liquid crystal material 66, 68, 70. Said cholesteric liquid crystal material is disposed in the said channels after said substrates are bound together, but prior to sealing the edges thereof. The cholesteric liquid crystal material may be unmixed material adapted to either transmit or reflect portions of incident light. Alternatively, it is possible to mix said cholesteric liquid crystal material with other liquid crystal materials, and/or compounds, in order to achieve a desired optical effect. For example, by adding a nematic liquid crystal material, or a nematic mixture such as Merck E7, to said cholesteric liquid crystal material, it is possible to alter the wavelength of light which will be reflected by said material. It is therefore possible to alter said material so that it reflects different colored light, such as red light, green light, or blue light. Accordingly, it is possible to provide a full color liquid crystal display device by disposing, for example, a layer of red altered cholesteric liquid crystal material in channel 36, a layer of blue altered cholesteric liquid crystal material in channel 38, and a layer of green altered cholesteric liquid crystal material in channel 40. It will be apparent to one of ordinary skill in the art to reflect other combinations of colors to effect a full color display.

Figure 4:
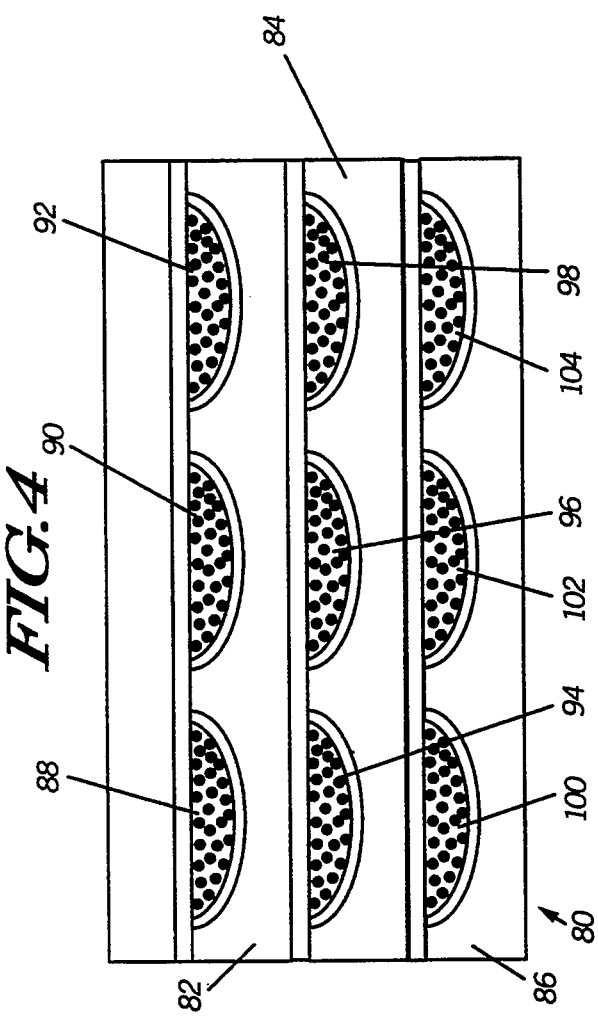
FIG. 4 is a cross sectional side view of a plurality of liquid crystal display devices in accordance with the instant invention, and arranged in stacked relationship.

Referring now to FIG. 4, there is illustrated therein a cross sectional view of a plurality of liquid crystal display devices in accordance with the instant invention. The liquid crystal display devices are arranged in a stacked relationship, wherein the channels of each display are disposed one atop the other in parallel, overlapping relationship. Specifically, liquid crystal display device 80 of FIG. 4 consists of a plurality of liquid crystal display subassemblies 82, 84 and 86, each said liquid crystal subassembly being fabricated as disclosed hereinabove with respect to FIG. 3. Each said display subassembly is then stacked one atop the other and bonded together. Alternatively, and in order to minimize the thickness and weight of the liquid crystal display device 80 as in FIG. 4, it may be desirable to bond the first substrate 30 of subassembly 86 to the second surface 34 of the first substrate of subassembly 84. Similarly, the channeled surface 32 of subassembly 84 may be bonded to the second surface 34 of subassembly 82. The channeled surface of subassembly 82 is then the only subassembly which is bonded to an independent second substrate. Since the first substrate 30 second surface 34 is acting as the second substrate, it is necessary to deposit a layer of transparent condition material on said second surface 34.

Also it is to be understood that in the liquid crystal display device 80 disclosed in FIG. 4, each of the overlapping subassemblies may have differently tailored cholesteric liquid crystal material in each channel. Overlapping devices may then have differently tailored materials disposed therein. For example, in subassembly 82, channels 88, 90 and 92 are respectively adapted to reflect red light, green light, and blue light. Similarly, in subassembly 84 channels 94, 96 and 98 are respectively adapted to reflect green light, blue light, and red light. Finally, in subassembly 86, channels 100, 102 and 104 are adapted to reflect blue light, red light, and green light respectively. Since cholesteric liquid crystal material adapted to reflect a particular wavelength of light will transmit light that is not in the tailored range, it is possible to effect a full color liquid crystal display by employing the configuration illustrated in FIG. 4.

Figure 5:
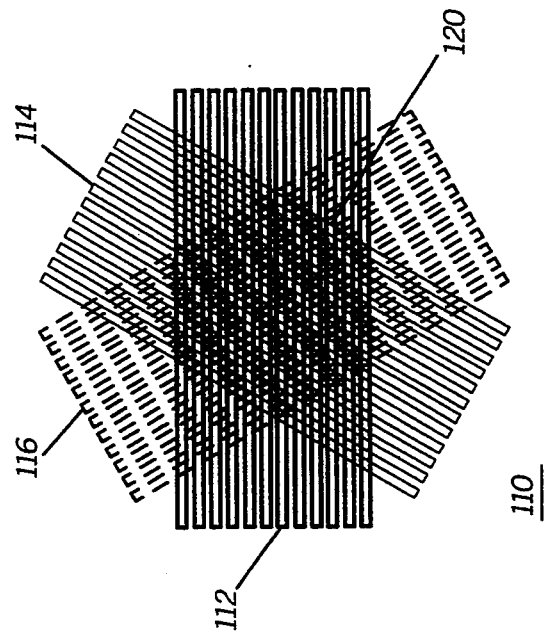
FIG. 5 is a top view of an alternate embodiment of a plurality of liquid crystal display devices in accordance with the instant invention, and arranged in stacked relationship.

Referring now to FIG. 5 there is illustrated therein an alternate embodiment of a plurality of liquid crystal display devices arranged in a stacked relationship. The liquid crystal display device 110 includes 3 liquid crystal subassemblies 112, 114 and 116 fabricated as disclosed with respect to FIG. 3, and respectively adapted to reflect blue light, green light, and red light. In this embodiment, each display is adapted to reflect only one color light. By disposing the liquid crystal subassemblies in a stacked relationship, wherein the channels formed in the surfaces of each subassembly are arranged in non-parallel relationship with respect to one another, a full color liquid crystal display is provided in the area 120.

The embodiment of FIG. 5 is possible since in a cholesteric liquid crystal display, only one polarization component of light incident thereon is reflected. Opposite polarization components pass through the display. Accordingly, when a circularly polarized light beam is reflected from the surface of the cholesteric liquid crystal display, the sense of the polarization is not reversed. Thus, a left handed cholesteric display could be stacked on top of a right handed cholesteric display (or vice versa) to improve brightness and contrast, or to effect a particular color. Upon striking the first display, the left handed circularly polarized component (at a certain color) would be reflected. The right hand component would pass through the display and be reflected by the right handed display underneath. Since its polarization sense is not reversed by striking the underlying layer, it would still be right handed and pass through the top display.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A liquid crystal display device comprising:
    a first substrate fabricated of an optically anisotropic polymeric material, said substrate having a layer of transparent conductive material disposed on at least part of one surface thereof;
    a second substrate fabricated of an optically anisotropic polymeric material, said second substrate having a plurality of channels formed on one surface thereof, said channels having a layer of transparent conductive material disposed therein, said second substrate being operatively positioned relative to said first substrate so that said channeled surface of said second substrate is in substantially parallel, facing relationship with said coated surface of said first substrate; and
    a layer of cholesteric liquid crystal material disposed in each of said channels.

2. A display device as in claim 1, wherein said first and second substrates are bonded to one another.

3. A display device as in claim 2, wherein said substrates are bonded in the regions between said channels.

4. A display device as in claim 1, wherein said substrates are fabricated from an extruded thermoplastic material selected from the group of materials consisting of polyester, polyethyleneterephalate, polyetheretherketone, polyetherimide, polyvinylidene fluoride, and combinations thereof.

5. A display device as in claim 1, wherein said transparent conductive material is a transparent conductive oxide.

6. A display device as in claim 5, wherein said transparent conductive oxide is indium tin oxide.

7. A display device as in claim 1, where said cholesteric liquid crystal material is admixed with other liquid crystal materials so as to reflect different wavelengths of light.

8. A display device as in claim 7, wherein said admixtures of cholesteric liquid crystal material are adapted to reflect red, green, and blue light.

9. A display device as in claim 8, wherein different admixtures of cholesteric liquid crystal material are disposed in each said channel.

10. A liquid crystal display device comprising:
    at least two liquid crystal display sub-assemblies, each said subassembly comprising:
    a first substrate fabricated of an optically anisotropic polymeric material, said substrate having a layer of transparent conductive material disposed on at least part of one surface thereof;
    a second substrate fabricated of an optically anisotropic polymeric material, said second substrate having a plurality of channels formed on one surface thereof, said channels having a layer of transparent conductive material disposed therein, said second substrate being operatively positioned relative to said first substrate so that said channeled surface of said second substrate is in substantially parallel, facing relationship with said coated surface of said first substrate; and
    a layer of cholesteric liquid crystal material disposed in each of said channels; and
    said at least two subassemblies being arranged in a stacked configuration.

11. A display device as in claim 10, wherein said sub-assemblies are stacked so that the channels of one sub-assembly are parallel to and overlap the channels of said other sub-assembly.

12. A display device as in claim 10, wherein said sub-assemblies are stacked so that the channels of one sub-assembly are stacked orthagonally to the channels of said other sub-assemblies.

13. A display device as in claim 10, wherein each said sub-assembly is adapted to reflect different wavelengths of light.

14. A display device as in claim 13, comprising at least three sub-assemblies, one sub-assembly adapted to reflect red light, one sub-assembly adapted to reflect blue light, and one sub-assembly adapted to reflect green light.

* * * * *